US012370770B2

(12) United States Patent
Caporale et al.

(10) Patent No.: US 12,370,770 B2
(45) Date of Patent: Jul. 29, 2025

(54) APPARATUS AND METHOD FOR AUTOMATICALLY PRODUCING TUBULAR ELEMENTS

(71) Applicant: I.M.A. INDUSTRIA MACCHINE AUTOMATICHE S.P.A., Ozzano Dell'Emilia (IT)

(72) Inventors: Antonio Caporale, Ozzano Dell'Emilia (IT); Luca Galletti, Ozzano Dell'Emilia (IT)

(73) Assignee: I.M.A. INDUSTRIA MACCHINE AUTMOMATICHE S.P.A., Ozzano Dell'Emilia (IT)

(*) Notice: Subject to any disclaimer, the term of this patent is extended or adjusted under 35 U.S.C. 154(b) by 0 days.

(21) Appl. No.: 18/724,690

(22) PCT Filed: Dec. 22, 2022

(86) PCT No.: PCT/IT2022/050339

§ 371 (c)(1),
(2) Date: Jun. 27, 2024

(87) PCT Pub. No.: WO2023/126987

PCT Pub. Date: Jul. 6, 2023

(65) Prior Publication Data

US 2025/0074027 A1 Mar. 6, 2025

(30) Foreign Application Priority Data

Dec. 28, 2021 (IT) ........................ 102021000032735

(51) Int. Cl.
*B31C 1/00* (2006.01)
*B31C 7/04* (2006.01)

(52) U.S. Cl.
CPC ..................................... *B31C 7/04* (2013.01)

(58) Field of Classification Search
CPC ....... B65B 29/028; B65B 29/04; B65B 3/003; B65B 51/225; B65B 9/045; B65B 43/50; B65B 7/2807; B65B 19/04; B65B 5/103; B65B 57/14; B65B 1/02; B65B 2220/14; B65B 29/022; B65B 1/32
(Continued)

(56) References Cited

U.S. PATENT DOCUMENTS 1,614,643 A * 1/1927 Barlow ..................... B31C 7/04 493/278
2,424,540 A * 7/1947 Bogoslowsky ........... B31C 1/00 493/193

FOREIGN PATENT DOCUMENTS

DE 3240618 A1 * 6/1983 ............... B31C 1/02
DE 3426257 A1 1/1986
(Continued)

OTHER PUBLICATIONS

International Search Report filed in PCT/IT2022/050339 mailed May 30, 2023.

*Primary Examiner* — Jacob A Smith
(74) *Attorney, Agent, or Firm* — RANKIN, HILL & CLARK LLP

(57) ABSTRACT

An apparatus for automatically producing tubular elements to make smoking articles and/or products for food use includes at least one forming unit configured to form the tubular elements starting from shaped flat sheets. The forming unit includes one or more forming devices which are moved by movement means along a work path closed in a loop, in order to form the tubular elements.

14 Claims, 5 Drawing Sheets

(58) Field of Classification Search
USPC ........ 53/134.2, 559, 413, 53, 253, 453, 561, 53/251, 566, 250, 281, 282, 54, 900, 246, 53/471, 553, 122, 235
See application file for complete search history.

(56) References Cited

FOREIGN PATENT DOCUMENTS

| | | | |
|---|---|---|---|
| FR | 400218 | A | 7/1909 |
| GB | 133680 | A | 4/1920 |

* cited by examiner

APPARATUS AND METHOD FOR AUTOMATICALLY PRODUCING TUBULAR ELEMENTS

FIELD OF THE INVENTION

The present invention concerns an apparatus and a method for automatically producing tubular elements, for example to make smoking articles, such as for example cigarettes, and/or products for food use, such as straws. By way of a non-restrictive example, in the case of smoking articles, the tubular element can be understood as the external wrapper, or smokable paper inside which the smokable substance is inserted, with or without a filter interposed.

BACKGROUND OF THE INVENTION

Especially in the last few years, the need to make small tubular elements for the above use has been growing, guaranteeing high productivity and very advanced automation.

Normally, the external wrappers for smoking articles have a substantially cylindrical or truncated cone shape and are made of non-toxic paper that is very thin and fragile, and is therefore very difficult to treat mechanically.

Apparatuses are known for the production of tubular elements, in particular straws, by winding, in a helicoidal manner, one or more strip-like elements of flexible material, preferably paper, partly overlapping each other, around a forming member, called a forming pin, which is substantially cylindrical in shape.

However, these known apparatuses have the disadvantage that they are excessively complex and produce tubular elements with peripheral walls that are too thick, and therefore suitable to make straws but not suitable to make smoking articles.

There is therefore a need to make an apparatus for automatically producing tubular elements to make both smoking articles and products for food use, which can overcome at least one of the disadvantages of the state of the art.

To do this it is necessary to solve the technical problem of automatically making tubular elements with a material that is very thin, fragile and difficult to process, such as paper, while still maintaining high productivity, in the order of over 10,000 pieces/hour.

In particular, one purpose of the present invention is to provide an apparatus and to perfect a method for automatically producing tubular elements which can be used for making smoking articles and/or products for food use.

Another purpose of the present invention is to provide an apparatus and to perfect a method for automatically producing tubular elements, especially of small sizes and very light, which are highly efficient, versatile and which allow to obtain high productivity.

Another purpose of the present invention is to provide an apparatus and to perfect a method for automatically producing modular elements which can be integrated into a more complex machine, also able to perform other work on the tubular elements, for example to package finished smoking articles.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the present invention or variants to the main inventive idea.

In accordance with the above purposes, and to resolve the technical problem disclosed above in a new and original way, also achieving considerable advantages compared to the state of the prior art, an apparatus according to the present invention for automatically producing tubular elements to make smoking articles and/or products for food use comprises a feed unit for feeding, in sequence and one at a time, a plurality of sheets in a flat condition, and a forming unit disposed downstream of the feed unit and configured to form the tubular elements starting from the sheets.

In accordance with one aspect of the present invention, the forming unit comprises one or more forming devices, each of which in turn comprises both a forming pin rotatable around an axis of rotation thereof and having an external surface with a truncated cone or cylindrical shape, coaxial to said axis of rotation, and also holding means for temporarily holding one of the sheets against the external surface. Movement means are configured both to move the one or more forming devices along a work path, and also to make the forming pins rotate around the respective axis of rotation. Furthermore, contrast means are disposed in a certain fixed position along the work path to cooperate with each of the sheets in order to fold them in such a way that they are at least partly wound each one around a corresponding forming pin in order to form one of the tubular elements.

In accordance with one aspect of the present invention, the forming device is configured to take the sheet, which is held against the external surface of the forming pin by the holding means, against the contrast means while the respective forming pin is made to rotate, so as to cause the at least partial winding of the sheet on the external surface of the forming pin during the movement of the forming device along the work path.

In accordance with another aspect of the present invention, the holding means comprise a suction system configured to suction air through a plurality of suction holes present in the external surface of the forming pin so as to selectively hold one of the sheets against the external surface, keeping it adherent thereto.

In accordance with another aspect of the present invention, the holding means comprise, alternatively or in addition to the suction system, a jaw that can be selectively driven to hold one of the sheets against the external surface, keeping it adherent thereto.

In accordance with another aspect of the present invention, the contrast means comprise a first contrast and guide member and a second contrast and guide member, both fixed and disposed on opposite parts with respect to the work path. The first and second contrast and guide members define a hollow space between them, inside which the forming pin can slide, preferably with minimum clearance.

In accordance with another aspect of the present invention, the first contrast and guide member and the second contrast and guide member are disposed in succession along the work path.

In accordance with another aspect of the present invention, the feed unit comprises, disposed in sequence along a feed path upstream of the forming unit, a shaping device configured to obtain shapes from a strip which correspond to the sheets still joined together, first advance means configured to make the strip advance along the feed path, a cutting device configured to cut the strip and make, by separating them, the sheets, and second advance means configured to make each of the sheets individually advance in a flat condition toward the forming unit.

In accordance with another aspect of the present invention, the work path of the forming unit is closed in a loop, preferably circular in shape or having at least one rectilinear segment.

In accordance with another aspect of the present invention, the apparatus also comprises an extraction member configured to extract one tubular element at a time from the respective forming device.

In accordance with another aspect of the present invention, the apparatus also comprises, along the work path, gluing means configured to apply an adhesive material on each of the sheets, if this is not already present on them.

In accordance with another aspect of the present invention, the apparatus also comprises a drying station configured to dry the adhesive material after the tubular element has been formed.

The apparatus according to the present invention has the advantage of being extremely versatile and being able to achieve high productivity, in the order of more than 10,000 tubular elements/hour.

In accordance with another aspect of the present invention, a method is perfected for automatically producing tubular elements to make smoking articles and/or products for food use, comprising in sequence a feed step in which several sheets in a flat condition are fed, in sequence and one at a time, toward a forming unit configured to form the tubular elements starting from said sheets.

The method comprises, in sequence, a positioning step in which each of the sheets is positioned and temporarily held on an external surface of a forming pin of a forming device, the forming pin being rotatable around an axis of rotation thereof, and a movement step in which the forming device, together with the held sheet, is moved along a work path.

In accordance with one aspect of the present invention, the method also comprises a forming step in which the forming device takes the sheet first against contrast means which are disposed in a certain fixed position along the work path, while the forming pin, together with the held sheet, rotates around its axis of rotation so as to cause the folding of two flaps of the sheet, in such a way that the latter is at least partly wound on the external surface of the forming pin.

In accordance with one aspect of the present invention, the method also comprises a forming step in which the forming pin, together with the held sheet, while it rotates around its axis of rotation along the work path, takes a first zone of a first of the two flaps to overlap with a second zone of a second of the two flaps, at least one of said first and second zones being provided with, or on which there is disposed, an adhesive material.

In accordance with another aspect of the present invention, each of the sheets comprises an internal face configured to contact the external surface of the forming pin, a first lateral edge adjacent to which there is the first zone which has, or on which there is deposited, the adhesive material, and a second lateral edge adjacent to which there is, on an external face opposite the internal face, the second zone, which is configured to be contacted by the first zone through overlapping. This overlapping is created by means of the rotation of the forming pin around its own axis of rotation.

In accordance with another aspect of the present invention, the forming step comprises a first folding step in which the forming device with the held sheet is made to advance along the work path in such a way that one of the two flaps is taken against a first contrast and guide member of the contrast means in order to fold it against said external surface, and a subsequent second folding step in which the forming device is made to advance further along the work path in such a way that the other of the two flaps is taken against a second contrast and guide member of the contrast means in order to fold it against the external surface of the forming pin.

DESCRIPTION OF THE DRAWINGS

These and other aspects, characteristics and advantages of the present invention will become apparent from the following description of some embodiments, given as a non-restrictive example with reference to the attached drawings wherein.

Figure 1:
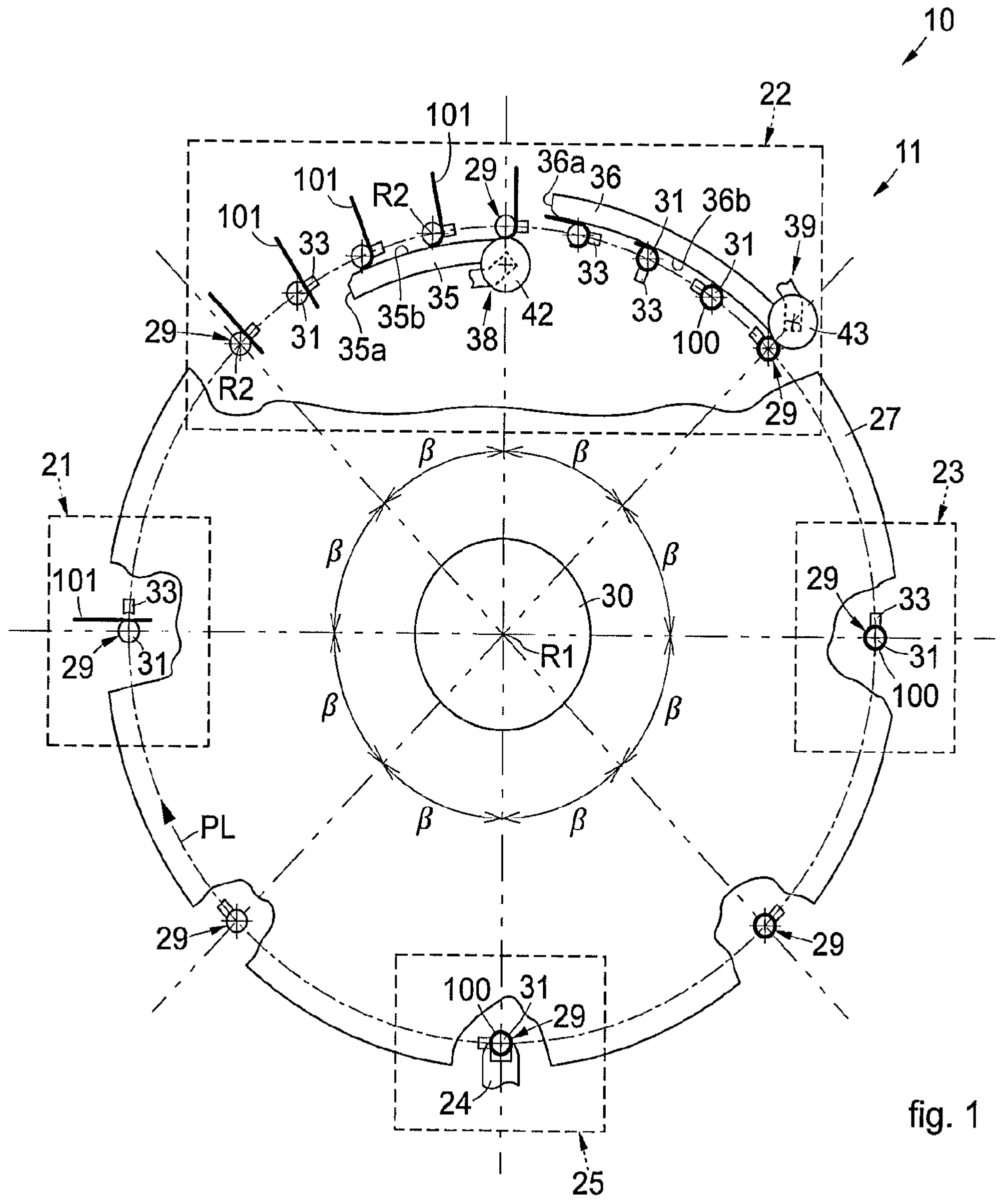
FIG. 1 is a schematic top view of an apparatus for automatically producing tubular elements according to the present invention and in accordance with one embodiment.

We must clarify that in the present description the phraseology and terminology used, as well as the figures in the attached drawings also as described, have the sole function of better illustrating and explaining the present invention, their function being to provide a non-limiting example of the invention itself, since the scope of protection is defined by the claims.

To facilitate comprehension, the same reference numbers have been used, where possible, to identify identical common elements in the drawings. It is understood that elements and characteristics of one embodiment can be conveniently combined or incorporated into other embodiments without further clarifications.

DESCRIPTION OF SOME EMBODIMENTS OF THE PRESENT INVENTION

Figure 17:
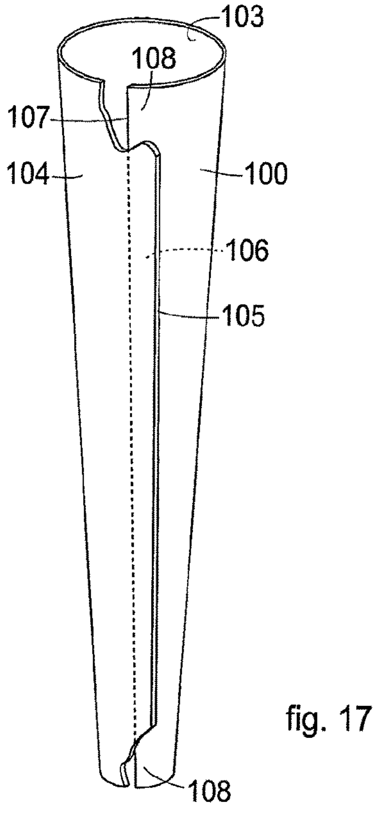
FIG. 17 is a three-dimensional view of a tubular element after it has been formed with the apparatus of FIG. 1, or of FIG. 14.

With reference to FIG. 1, an apparatus 10 according to the present invention is configured to produce tubular elements 100 (FIG. 17) in a completely automated manner, to make smoking articles and/or products for food use.

In accordance with possible embodiments of the present invention, the apparatus 10 (FIG. 1) can be part of a more complex machine, not shown in the drawings, which can comprise other apparatuses or stations for working the tubular elements 100.

Before describing the apparatus 10 in detail, in order to better understand the present invention, we will now describe a single tubular element 100.

In relation to the sector for which it is intended, the tubular element 100 can be made with different materials, for example: a) to make smoking articles, the material can be very thin and light paper, such as cigarette papers; b) for the food sector, paper made sufficiently impermeable, or another already impermeable material, can be used.

Figure 16:
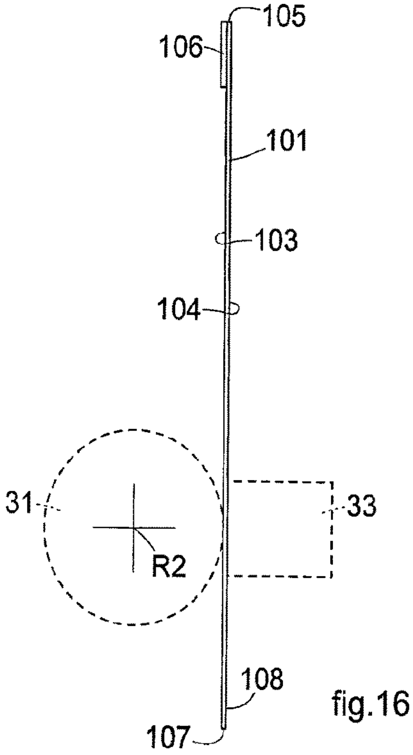
FIG. 16 is a top view of a shaped flat sheet for producing a tubular element with the apparatus of FIG. 1, or of FIG. 14.

Each tubular element 100 (FIG. 17) is obtained from a corresponding sheet 101 (FIGS. 3 and 16), in a flat condition, which in turn is obtained, for example, from a strip 102 (FIG. 3) which can be fed along a feed path PA in any known manner, for example by unwinding it from a reel not shown in the drawings.

The strip 102 can be of the type commonly on the market, already provided with a line, or zone, in which there is a very thin layer of adhesive material. This line is adjacent to one of the edges of the strip 102 and is present along the entire longitudinal development thereof.

Alternatively, the adhesive material, instead of being present on the strip 102, can be applied directly on the sheets 101 during a step of forming the tubular elements 100, as will be described in detail below.

We must clarify that the adhesive material can consist of any suitable material whatsoever, for example a vinyl glue, or natural gum Arabic, for example of the type that can be activated in the presence of water, or a glue of the type that is sensitive to pressure, also known to the people of skill in the art with the term "pressure-sensitive".

Figure 9:
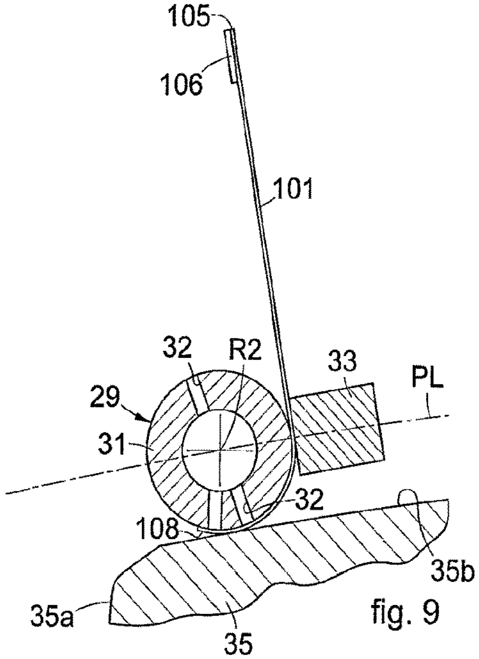
Figure 10:
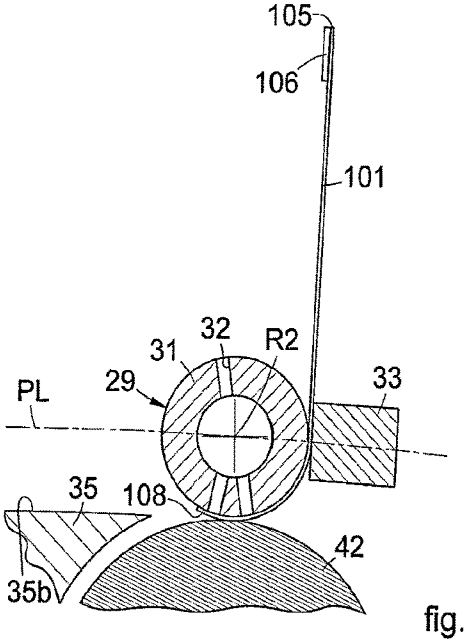
Figure 11:
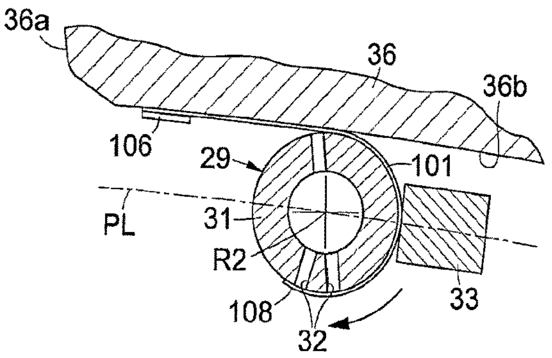
Figure 12:
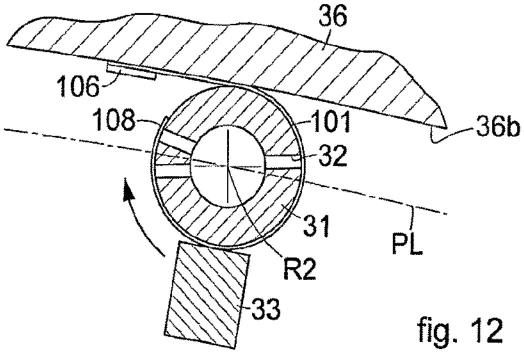

Each sheet 101 (FIG. 9) is substantially small in size and has, for example, a base comprised between about 4 mm and about 25 mm and a height comprised between about 60 mm and about 120 mm, and it can have the shape of an isosceles trapezoid, or a rectangle, depending on whether a corresponding tubular element 100 with a truncated cone or cylindrical shape is to be obtained, respectively.

In particular, each sheet 101 (FIGS. 16 and 17) comprises: a first internal face 103, which will then constitute the internal surface of the tubular element 100; a second external face 104, which will then constitute the external surface of the tubular element 100; a first lateral edge 105 adjacent to which there is a first zone 106 which can have, or on which there can be deposited, the adhesive material; and a second lateral edge 107 adjacent to which there is a second zone 108 configured to overlap with the first zone 106. Please note that the first zone 106 corresponds to the portion of the line of the strip 102 in which the adhesive material can be present, or not.

The apparatus 10 essentially comprises a feed unit 11 (FIGS. 3 and 4) for feeding a plurality of sheets 101 in sequence and one at a time, and a forming unit 12 (FIG. 1) disposed downstream of the feed unit 11 and configured to form the tubular elements 100 starting from corresponding sheets 101 in a flat condition. Please note that in the embodiments described here, the sheets 101 have the shape of an isosceles trapezoid, whereby each tubular element 100 will have a truncated cone shape.

Figure 3:
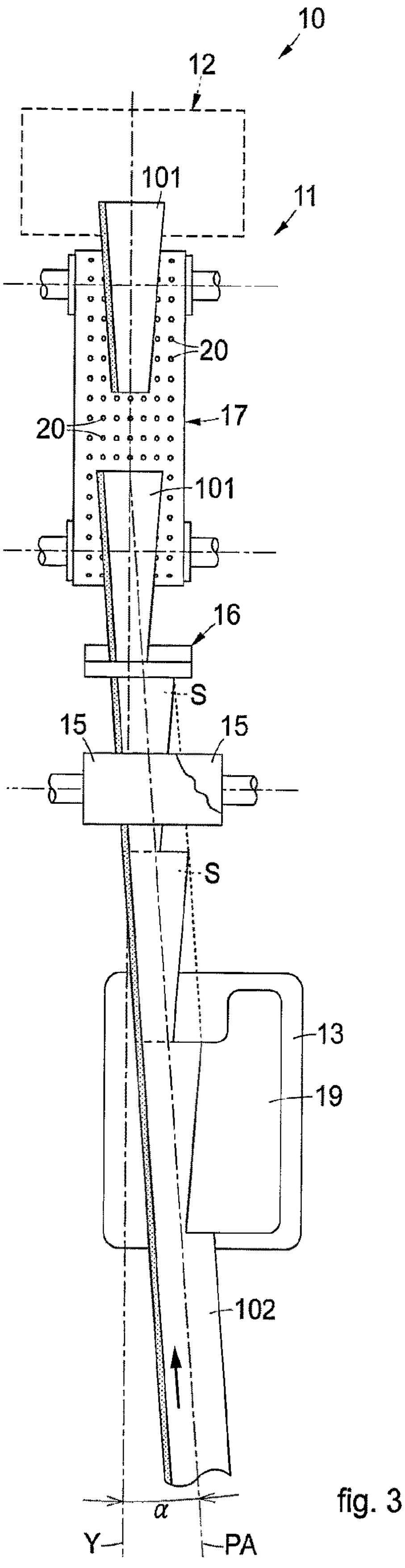
FIG. 3 is a schematic and partly sectioned front view of a unit for feeding shaped flat sheets of the apparatus of FIG. 1.
Figure 4:
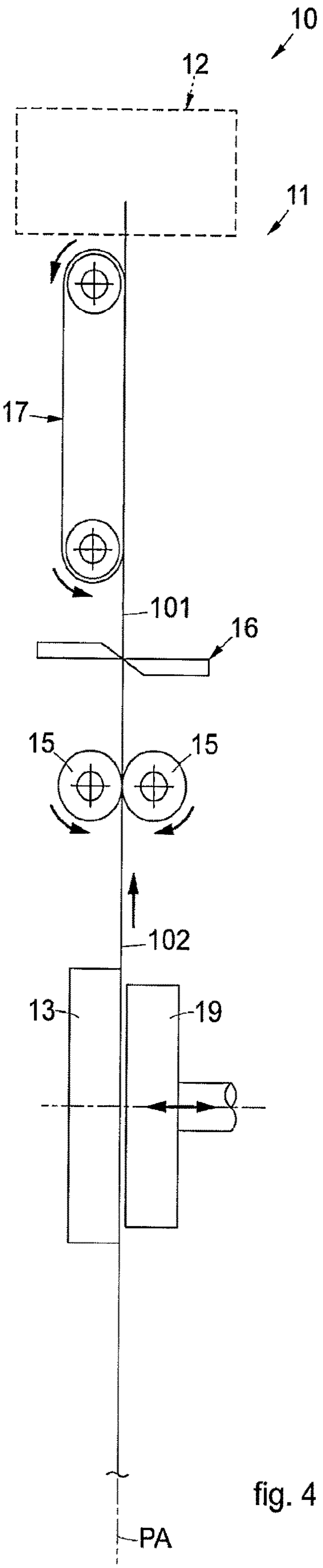
FIG. 4 is a schematic and partly sectioned lateral view of the feed unit of FIG. 3.

With reference to FIG. 3, the feed unit 11 comprises, disposed in sequence and from bottom to top, along the feed path PA of the strip 102, a shaping device 13, a pair of dragging rollers 15, a cutting device 16 and a transport member 17. The drive of the shaping device 13, the dragging rollers 15, the cutting device 16 and the transport member 17 is performed by respective actuation elements, for example provided with electric motors, and/or or by other actuators of a known type and not shown in the drawings.

In the examples given here, the feed path PA develops in a substantially vertical direction. It is clear that, according to other possible embodiments, not shown in the drawings, the feed path PA could develop in a horizontal direction, or a direction inclined with respect to a horizontal plane, or one having a curvilinear development, or it could have other suitable shapes.

The shaping device 13 is disposed on the feed path PA so that the strip 102 substantially passes through it in a central zone thereof. For example, the shaping device 13 is provided with at least one cutting member 19 which is configured to perform a shaping of the strip 102 according to a specific geometry and produce a plurality of shapes S, each having the form of one sheet 101 and contiguous to each other, without a break in continuity, in correspondence with the respective larger and smaller bases, respectively, of the isosceles trapezoids thus formed. Please note that the operation of shaping the strip 102 also produces a plurality of waste portions, or scraps, which are advantageously suctioned by the same shaping device 13, for example by means of suction means, of a known type and not shown in the drawings. Furthermore, the shaping device 13 is disposed in such a way that the portion of strip 102 which is cut and removed is the one on the opposite part with respect to the possible lateral zone on which the adhesive material is present or will later be applied.

As shown in FIG. 3, the feed path PA along which the strip 102 is made to advance is inclined by an angle $\alpha$ with respect to a generic reference direction Y, for example vertical. The angle $\alpha$ is chosen so that the external edge of the strip 102 defines one of the two oblique sides of the isosceles trapezoids which will then define the corresponding sheets 101, and it can be, for example, of approximately 10°. Consequently, the inclination of the cut performed by the cutting device 17 has to be specular with respect to the angle $\alpha$. Please also note that the angle $\alpha$ can be adjusted according to the specific operating requirements of the apparatus 10.

The transport member 17 consists, for example, of a conveyor belt provided with a plurality of suction holes 20 which have the function of selectively holding each sheet 101 against the conveyor belt along an ascending rectilinear segment thereof. Therefore, the transport member 17 has the function of making the sheet 101 advance, detaching it from the strip 102 already shaped, after the cut has been performed, and of delivering, in a known manner, each sheet 101 to the forming unit 12 keeping it in a flat and substantially vertical position.

Please note that in order to achieve the immediate detachment of the sheet 101 from the strip 102, after the cut has been performed, the transport member 17 has to have a speed of advance greater than the dragging speed imparted to the strip 102 by the dragging rollers 15 along the feed path PA.

The forming unit 12 (FIGS. 3 and 4) comprises a plurality of operating stations disposed in sequence along a work path PL, among which at least:

- a feed station 21 (FIGS. 1 and 2), in which the still flat, or outspread, sheets 101 coming from the feed unit 11 are fed one at a time until they intercept the work path PL;
- a forming station 22, in which one tubular element 100 at a time is formed starting from or using a corresponding sheet 101;

- a drying station 23, in which, after the tubular element 100 has been formed, the adhesive material present in the first zone 106 is made to dry, for example by means of infrared devices or other suitable devices;
- an extraction station 25, in which, by means of an extraction member 24, such as a gripper of the known type for example, one tubular element 100 at a time is extracted from the respective forming device 29 in order to take it toward another apparatus, or work station, not shown in the drawings.

Figure 5:
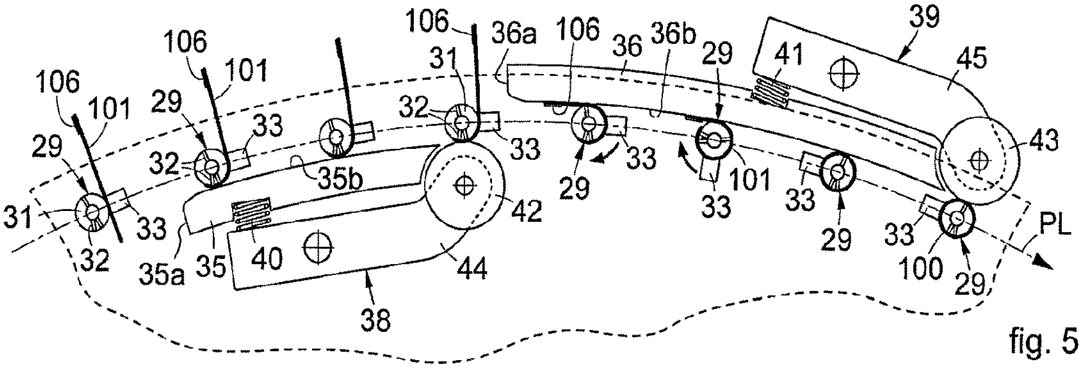
FIG. 5 is an enlarged detail of FIG. 1.
Figure 14:
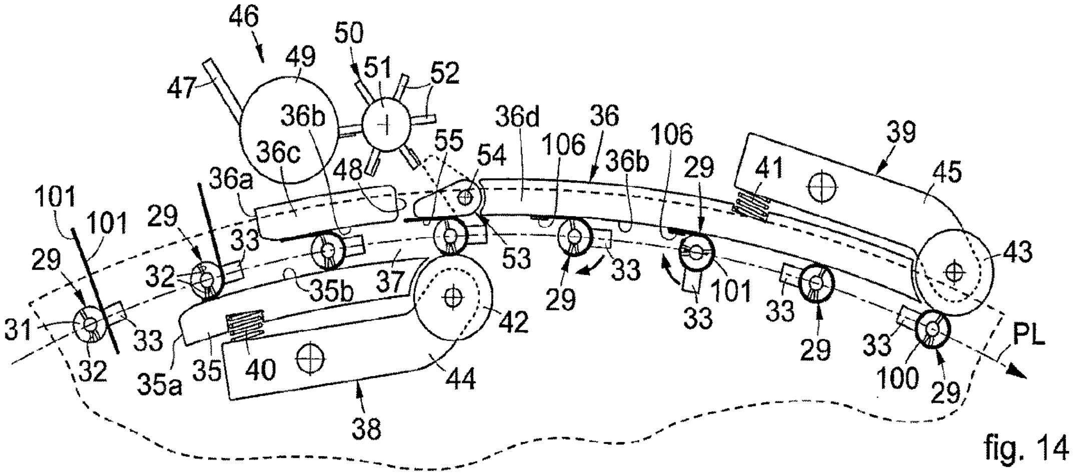
FIG. 14 is a schematic and partial top view of an apparatus for automatically producing tubular elements according to the present invention, in accordance with another embodiment.

In accordance with one aspect of the present invention, the work path PL of the forming unit 12 is closed in a loop and has, for example, a circular shape (FIGS. 1, 5 and 14).

Figure 2:
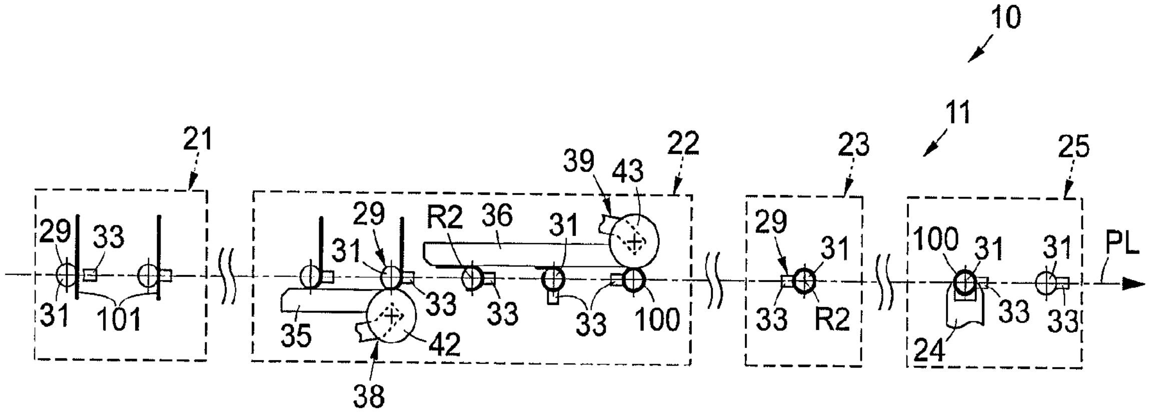
FIG. 2 is a schematic and linearized view to show some work steps of the apparatus of FIG. 1.
Figure 6:
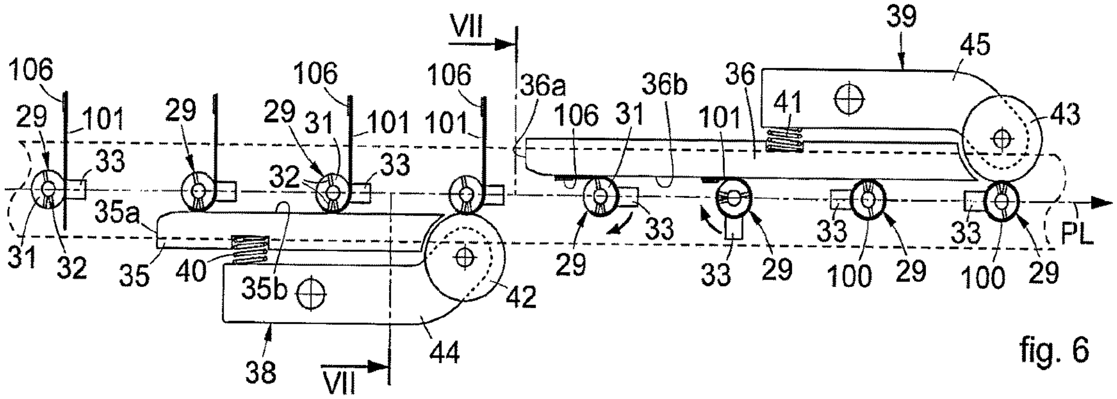
FIG. 6 is an enlarged detail of FIG. 2.
Figure 8:
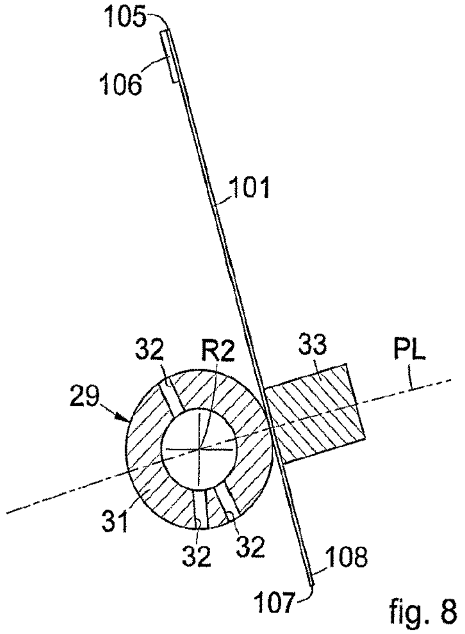
FIGS. 8 to 13 are detailed views of an operating sequence of the apparatus of FIG. 1.

According to other embodiments of the present invention, such as the one shown in FIGS. 2, 6 and 8 for example, the work path PL, although advantageously closed in a loop, has at least one rectilinear segment.

As shown in FIGS. 1, 5 and 14, the forming unit 12 comprises a disk-shaped rotating member 27 which defines, in correspondence with its periphery, the work path PL and which is rotatable around a main axis of rotation R1 of its own, for example vertical. The rotation of the rotating member 27 can occur, for example, with constant angular increments or pitches p. This allows to simultaneously perform, in correspondence with each station of the forming apparatus 12, a different operation on the sheets 101, or on the tubular elements 100, consequently increasing the overall productivity of the apparatus 10.

In the embodiment shown in FIG. 1 the angular pitch β is 45°, but it can also be different, that is, larger or smaller, depending on the design and construction choices of the apparatus 10. The rotation of the rotating member 27 is achieved by means of movement means 30 (FIG. 1), which can be of any known type whatsoever and can comprise, for example, an electronically controlled stepper motor.

Please note that the orientation of the main axis of rotation R1, as well as the disposition of the forming unit 12, is coordinated with the orientation of the feed path PA of the strip 102. For example, according to embodiments not shown in the drawings, with a feed path PA that is substantially horizontal, or inclined with respect to a horizontal plane, the main axis of rotation R1 will also be concordant with such orientation.

The forming unit 12 comprises one or more forming devices 29, which in the example given here are eight, which are mounted on the rotating member 27 with the same uniform angular intervals β (FIG. 1) along the work path PL. Furthermore, each forming device 29 can rotate around an axis of rotation thereof, or secondary axis of rotation, R2, parallel to the main axis of rotation R1.

The movement means 30 are configured to also be able to make each forming device 29 selectively rotate around its axis of rotation R2, as will be described in detail below. For example, the movement means 30 can comprise an epicyclic gearing and/or an electric or mechanical cam mechanism, of a known type and not shown in the drawings, associated with each forming device 29.

Figure 7:
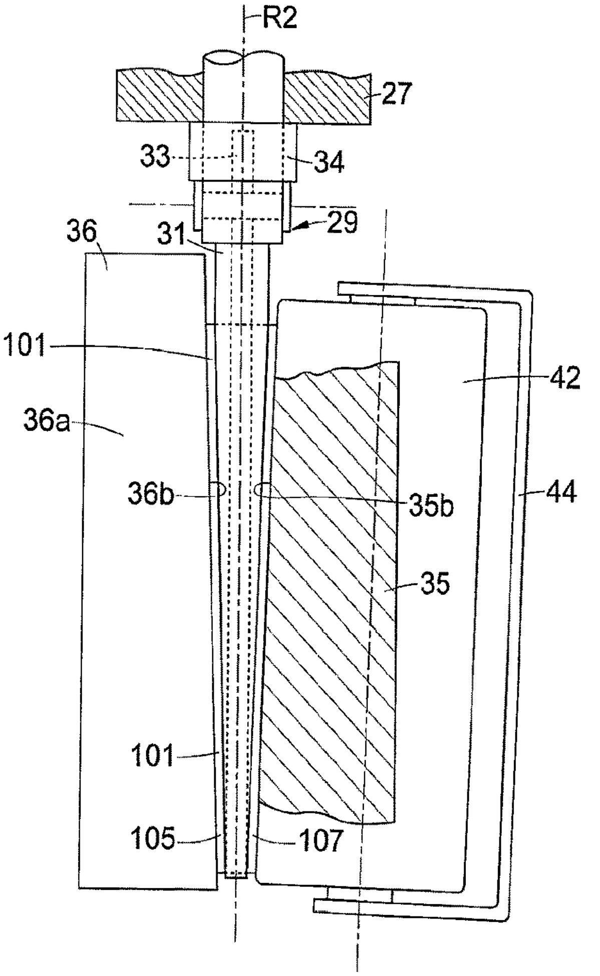
FIG. 7 is a section view of the apparatus of FIG. 6, along the section line VII-VII.

Each forming device 29 comprises both a forming pin 31 (FIG. 7), coaxial to the secondary axis of rotation R2, internally hollow and having an external surface with a truncated cone or cylindrical shape, which reproduces the shape of the tubular element 100 (FIG. 17) to be produced, and also holding means, described below and configured to temporarily and selectively hold a respective sheet 101 against the external surface of the forming pin 31 (FIGS. 8 to 13). As shown in FIG. 7, in the event that the forming pin 31 has a truncated cone shape, its part with the largest diameter is disposed close to the rotating member 27, that is, upward in the example given here.

In accordance with another aspect of the present invention, the holding means comprise, for each forming device 29, a jaw 33 (FIGS. 1, 5 and from 8 to 13), disposed outside the respective forming pin 31 and parallel to the secondary axis of rotation R2 thereof, the jaw 33 can be selectively driven to hold the sheet 101 against the external surface of the same forming pin 31. The selective opening and closing of the jaw 33 is achieved, for example, by means of a dedicated actuator 34 (FIG. 7), which can be associated with the forming pin 31 or with the rotating member 27. In addition, or as an alternative, to the jaw 33, the holding means comprise a suction system configured to suction air through a plurality of suction holes 32 present in the external surface of the forming pin 31, so as to selectively hold one sheet 101 at a time against the external surface, keeping the sheet 101 adherent thereto.

Please note that each sheet 101 coming from the feed unit 11 and delivered to the corresponding forming device 29 is positioned asymmetrically with respect to the position of the jaw 33 (FIGS. 1, 5 and 7), that is, with a first flap thereof, the one associated with the first lateral edge 105, which protrudes further from the forming pin 31 compared to a second flap associated with the second lateral edge 107.

The forming station 22 (FIGS. 1, 5 and 6) comprises a first contrast and guide member 35 and a second contrast and guide member 36, both mounted on a fixed structure of the apparatus 10, not shown in the drawings, and disposed in a certain position with respect to the work path PL and on opposite parts with respect thereto. The two contrast and guide members 35 and 36 are configured to cooperate with the two lateral flaps of each sheet 101 to at least partly fold them around a corresponding forming pin 31 in order to then form one of the tubular elements 100, as will be described in detail below.

In accordance with another aspect of the present invention, the first contrast and guide member 35 is disposed between the work path PL and the main axis of rotation R1 (FIG. 1), and comprises a first head shoulder 35*a* (FIG. 5) and an associated first guide surface 35*b*. The second contrast and guide member 36 is disposed outside the work path PL with respect to the main axis of rotation R1 (FIG. 1), and comprises a second head shoulder 36*a* (FIG. 5) and an associated second guide surface 36*b*. Seen from the front (FIG. 7), the two guide surfaces 35*b* and 36*b* are parallel to the external surface of each forming pin 31.

Some embodiments of the present invention can provide that the two guide surfaces 36*a* and 36*b* are positioned with respect to the work path PL in such a way as to define a hollow space 37 between them (e.g. FIGS. 14 and 15) with a substantially constant width, inside which each forming device 29 can slide with minimum clearance with respect to the corresponding forming pin 31.

Furthermore, along the work path PL, the first head shoulder 35*a* (FIG. 5) and the associated first guide surface 35*b* are disposed upstream of the second head shoulder 36*a* and the associated second guide surface 36*b*, that is, closer to the feed station 21 (FIG. 1). In this way, by making each forming device 29 advance with the respective held sheet 101 along the work path PL (clockwise in FIGS. 1 and 5, and from left to right in FIGS. 2 and 6) first the second flap of the sheet 101, that is, the least protruding one, is folded, which, meeting the first shoulder 35*a*, folds against the external surface of the forming pin 31, substantially assuming the shape of a J, and then the first flap, that is, the most protruding one, is folded which, meeting the second shoulder 36*a*, also folds against the external surface. As will be described in detail below, the forming of the tubular element 100 is then completed by the rotation of the forming pin 31 around the respective secondary axis of rotation R2, while this advances along the work path PL.

With the two contrast and guide members 35 and 36 there are associated a first presser member 38 and a second presser member 39, respectively, which are configured to exert a certain radial pressure on the sheet 101 with the passing of the forming pin 31 on which the latter is already at least partly wound.

The angular distance between the two presser members 38 and 39 (FIG. 1) is exactly the same as an angular interval p, whereby when a forming device 29 is in correspondence with the first presser member 38, another forming device 29 is in correspondence with the second presser member 39.

In particular, the first presser member 38 (FIGS. 5 and 7) comprises a first presser roller 42 mounted freely rotatable at one end of a first lever 44, which is pivoted on the fixed structure of the apparatus 10 and conditioned by a first spring 40 (FIG. 5). The second presser member 39 comprises a second presser roller 43 mounted freely rotatable at one end of a second lever 45, pivoted on the fixed structure of the apparatus 10 and conditioned by a second spring 41.

The two presser rollers 42 and 43 are shaped and positioned in such a way as to contact, for their entire height, each sheet 101 (FIG. 7) held against the external surface of a forming pin 31, when the latter passes in front of the same presser rollers 42 and 43 moving along the work path PL. Furthermore, the first and second springs 40 and 41 (FIG. 5) are calibrated so that the presser members 42 and 43 impart a slight pressure on each sheet 101 against the corresponding forming pin 31.

In the example given here, the two presser rollers 42 and 43 have their axis of rotation inclined in such a way that their cylindrical surfaces adapt precisely to the truncated cone shape of the forming pin 31 (in FIG. 7, only the first presser roller 42 can be seen, by way of example).

Alternatively, in accordance with other embodiments of the present invention not shown in the drawings, the presser rollers 42 and 43 may not be inclined, but have a peripheral surface mating with the shape of the forming pin 31.

In accordance with another embodiment of the present invention, if a water-activated vinyl glue is present on the first zone 106 of the sheet 101, advantageously the first presser roller 42 is made of a material which allows it to be kept humidified, in any known manner whatsoever. In this case, the first presser roller 42 is configured, in addition to exert a certain pressure on the sheet 101, also to humidify the zone of contact therewith, which corresponds to the second zone 108 which will then go below the first zone 106, so as to activate the vinyl glue during the operation of forming the tubular element 100, as will be described in detail below.

Figure 15:
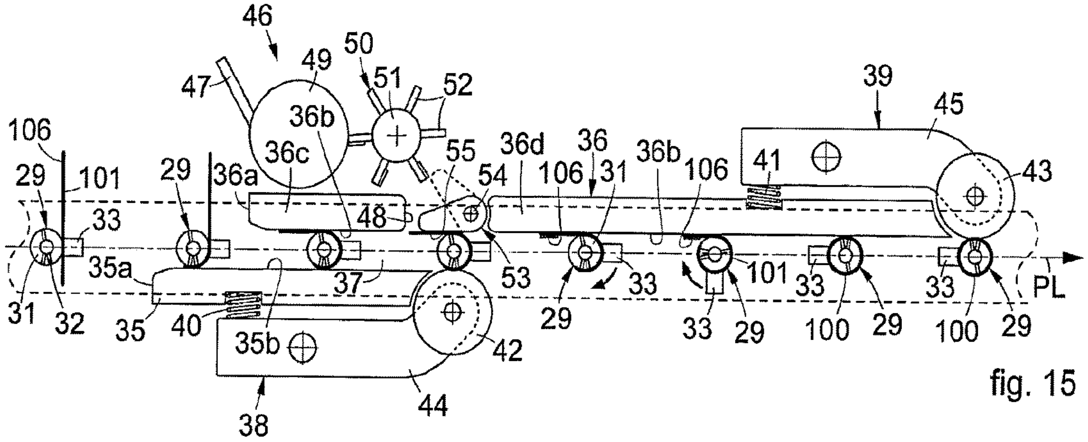
FIG. 15 is a schematic and linearized view to show some work steps of the apparatus of FIG. 14.

In accordance with another embodiment of the present invention, shown in FIGS. 14 and 15, if no adhesive material is present on the first zone 106, it is provided that the forming unit 12 also comprises a gluing unit 46, disposed in the forming station 22, in correspondence with the second contrast and guide member 36, and configured to apply a certain quantity of adhesive material on each first zone 106 of a sheet 101.

For example, the gluing unit 46 comprises: a glue-spreading roller 49 of the rotary type, impregnated with glue or other adhesive material, tangential to which there is disposed a fixed scraper 47; an applicator member 50 of the rotary type provided with spreading radial blades 52; and a movement mechanism 51, which are driven by respective electric motors and/or actuators, of a known type and not shown in the drawings.

The movement mechanism 51 is disposed in front of the first presser roller 42 in a through aperture 48 created in the second contrast and guide member 36, whereby the latter is divided into two portions 36*c* and 36*d*, the first of which, together with the first contrast and guide member 35, forms the hollow space 37.

In the example given here, the movement mechanism 51 comprises a lever 53 pivoted on a pin 54 which is mounted on the fixed structure of the apparatus 10. The lever 53 comprises a contact plate 55 configured to contact the external face 103 of the first flap of each sheet 101 and provided with suction means, of a known type and not shown in the drawings, which are configured to temporarily hold such first flap of the sheet 101, for example for a few milliseconds.

The lever 53 has a length such as to allow the first zone 106 to protrude therefrom, when the first flap of the sheet 101 is held by the suction means; this is necessary for a correct glue spreading operation to be performed by one of the radial blades 52 of the applicator member 50.

Furthermore, the lever 53 is selectively and alternately mobile, commanded by an associated actuator of a known type and not shown in the drawings, between a first operating position, in which it is with the contact plate 55 aligned with the second guide surface 36*b* of the second contrast and guide member 36, and a second operating position, in which, holding the first flap of the sheet 101, it is rotated by a certain angle, for example of about 45°, so that the first zone 106 of the sheet 101 is in correspondence with the spreading radial blades 52 of the applicator member 50. For example, the adhesive material used in this case can be a natural vinyl glue or rubber of the pressure-sensitive type.

Therefore, the apparatus 10 has the advantage of being very versatile and of having high productivity, with a cycle time of about 0.3 seconds, thus producing about 12,000 tubular elements 100 per hour.

The apparatus 10 also comprises a central control unit of a known type and not shown in the drawings, which is configured to command and coordinate the drive of the feed unit 11 and of the forming unit 12, as well as of the respective operating components.

The operation of the apparatus 10 described heretofore, which corresponds to the method according to the present invention, comprises the following steps.

We must clarify that what has been described for a single sheet 101 is valid cyclically for each of the sheets 101 with which the tubular elements 100 are obtained.

In an initial preparation step, the central control unit is configured and prepared to control and coordinate the drive of the feed unit 11, of the forming unit 12 and of their operating components.

In a feed step, the feed unit 11 feeds one sheet 101 at a time, obtained from the strip 102, toward the forming unit 12 along a feed path PA.

The feed step comprises the following operating sub-steps:

a shaping step, in which the raw strip 102 (FIG. 3), while it is made to advance along the feed path PA by the dragging rollers 15, is shaped on the fly by means of the shaping device 13, according to a specific geometry which allows to subsequently obtain the sheets 101;

a cutting step, in which the cutting device 16 performs, on the fly, a cut to size of the already shaped strip 102, so as to obtain from the latter one sheet 101 at a time having, in the example given here, the shape of an isosceles trapezoid; and a transport and delivery step, in which the transport member 17 transports one sheet 101 at a time and delivers it, in a known manner, to one of the forming devices 29 of the forming unit 12, in correspondence with the feed station 21 thereof.

Please note that during the transport and delivery step, the rotating member 27 is temporarily stationary, for example for a few tens of milliseconds, and one of the forming devices 29 is in a receiving position with the corresponding jaw 33 in an open condition.

In a subsequent positioning step (FIG. 8), the sheet 101 in a flat condition is disposed substantially vertical and tangential to the external surface of a forming pin 31 (FIG. 16) of a corresponding forming device 29. Then, in this position, the jaw 33 is closed, so as to hold the sheet 101 against the external surface of the forming pin 31. In particular, as previously described, the sheet 101 is blocked by the jaw 33 in an asymmetrical position with respect to the forming pin 31, with the first flap, associated with the first lateral edge 105, protruding more than the second flap, associated with the second lateral edge 107.

Subsequently, in a movement step, the movement means 30 make the forming device 29 advance along the work path PL until it reaches the first head shoulder 35*a*.

Then an actual forming step begins (shown schematically in FIGS. 9 to 13), in which each tubular element 100 is formed thanks to the combination of the advance of each forming pin 31 with the respective held sheet 101 along the work path PL and the rotation of the forming pin 31 with the respective held sheet 101 with respect to the respective secondary axis of rotation R2. During this forming step, the suction system also contributes, through the air suctioned through the suction holes 32 of the forming pin 31, to hold the sheet 101 so as to keep it adherent to the external surface of the forming pin 31, as the sheet 101 is gradually wound thereon.

Figure 13:
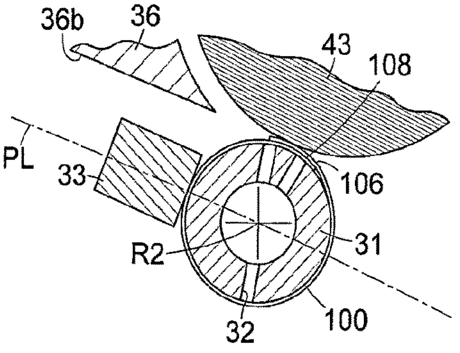

In particular, the forming step comprises, in sequence, the following operating sub-steps:

a first folding sub-step (FIG. 9), in which the second flap of the sheet 101 first goes into contact with the first head shoulder 35*a* and then with the first guide wall 35*b*, whereby it is folded and partly wound against the external surface of the forming pin 31. In this way, the sheet 101, also thanks to the action of the suction holes 32, substantially assumes the shape of a J;

a first temporary stop sub-step (FIG. 10), in which the rotating member 27 is temporarily stationary for a few tens of milliseconds and the forming device 29 in question is in correspondence with the first presser roller 42, which at least partly contacts the second zone 108 of the sheet 101, possibly humidifying it, in the event that water-activated vinyl glue is disposed on the first zone 107 of the sheet 101;

a second folding sub-step (FIG. 11), in which the first flap of the sheet 101 first goes into contact with the second head shoulder 36*a* and then with the second guide wall 36*b*, whereby it is folded and partly wound against the external surface of the forming pin 31. In this way, the first flap of the sheet 101 is substantially parallel to the work path PL;

a forming completion sub-step, in which the forming pin 31, while continuing to advance along the work path PL, is rotated first clockwise with a first rotation of 90° to continue the winding of the sheet 101 on the pin itself (FIG. 12), and then clockwise with a second rotation of an additional 900 to complete the winding of the sheet 101 and take the first zone 106 thereof, provided with the adhesive material, to overlap with and glue onto the second zone 108, which is possibly humidified; and a second temporary stop sub-step (FIG. 13), in which the rotary member 27, after having completed a clockwise rotation of an angular pitch β (FIG. 1) with respect to the first temporary stop sub-step, is once again temporarily stationary, for example for a few tens of milliseconds, and the forming device 29 in question is in correspondence with the second presser roller 43 (FIGS. 1 and 13). The latter, thanks to the force impressed by the second spring 41, exerts a certain pressure on the overlapping zone of the first zone 106 with the second zone 108, thus consolidating the closure of the sheet 101.

Once the forming step has been completed, in a subsequent drying step the forming device 29 in question is transported in correspondence with the drying station 23, where the glue is completely dried.

Finally, in an extraction step, the forming device 29 in question is transported in correspondence with the extraction station 25, where an extraction member 24 extracts the tubular element 100 from the forming pin 31.

In the event that the first zone 106 is not already provided with the adhesive material, a gluing step is provided, in which the gluing unit 46 is driven to apply a layer of adhesive material on the first zone 106 of the sheet 101. This gluing step occurs in conjunction with the first temporary stop sub-step, that is, when the forming device 29 is in correspondence with the first presser roller 42.

For example, in this gluing step, the movement mechanism 51 lifts the first flap of the sheet 101 and takes it in correspondence with the applicator member 50, which applies the adhesive material by means of one of the radial blades 52.

Please note that, in this case, the first flap of the sheet 101 may not have already been folded by the first portion 36*c*, before the gluing operation. Furthermore, in this case, the first presser roller 42 does not perform any function of humidifying the second zone 108.

It is clear that modifications and/or additions of parts may be made to the apparatus 10 and to the method as described heretofore, without departing from the field and scope of the present invention, as defined by the claims.

For example, the sheets 101, instead of being made from the strip 102, could already be shaped in any known manner whatsoever, stacked in a sheet feeder and fed one at a time to the feed station 21, in a manner coordinated with the movement of the forming devices 29 along the work path PL.

Furthermore, in accordance with other possible embodiments of the present invention, not shown in the drawings, particularly if the tubular element 100 is intended for the smoking articles sector, it can be provided that the forming pin 31 is conformed in such a way as to allow the insertion, inside its axial cavity, of a suitable filter, which will then be operatively associated with the tubular element 100. The insertion of the filter in the axial cavity of the forming pin 31 can be provided upstream or downstream of the forming station 22, in a specific filter insertion station.

It is also clear that, although the present invention has been described with reference to some specific examples, a person of skill in the art shall certainly be able to achieve many other equivalent forms of apparatuses for automatically producing tubular elements, having the characteristics as set forth in the claims and hence all coming within the field of protection defined thereby.

In the following claims, the sole purpose of the references in brackets is to facilitate their reading and they must not be considered as restrictive factors with regard to the field of protection defined by the same claims.

The invention claimed is:

1. Apparatus for automatically producing tubular elements to make smoking articles and/or products for food use, comprising a feed unit for feeding, in sequence and one at a time, a plurality of sheets in a flat condition, and a forming unit disposed downstream of said feed unit and configured to form said tubular elements starting from said sheets in a flat condition, said forming unit comprising one or more forming devices, each of which in turn comprises both a forming pin rotatable around an axis of rotation thereof and having an external surface with a truncated cone or cylindrical shape, and also holding means for temporarily holding one of said sheets against said external surface; movement means configured both to move said one or more forming devices along a work path, and also to make said forming pins rotate around the respective axis of rotation; and contrast means disposed in a certain fixed position along said work path to cooperate with said sheets in order to fold them in such a way that they are at least partly wound each one around a corresponding forming pin in order to form one of said tubular elements, wherein said forming device is configured to take said sheet, held by the holding means against the external surface of the forming pin, against the contrast means while the respective forming pin is made to rotate, so as to cause the at least partial winding of the sheet on the external surface of the forming pin during the movement of the forming device along the work path.

2. Apparatus as in claim 1, wherein said holding means comprise a suction system configured to suction air through a plurality of suction holes present on said external surface of said forming pin so as to selectively hold one of said sheets against said external surface, keeping it adherent thereto.

3. Apparatus as in claim 1, wherein said holding means comprise a jaw that can be selectively driven to hold one of said sheets against said external surface, keeping it adherent thereto.

4. Apparatus as in claim 1, wherein said contrast means comprise a first contrast and guide member and a second contrast and guide member, both fixed and disposed on opposite parts with respect to said work path.

5. Apparatus as in claim 4, wherein said first contrast and guide member and said second contrast and guide member are disposed in succession along said work path.

6. Apparatus as in claim 1, wherein said feed unit comprises, disposed in sequence along a feed path upstream of said forming unit, a shaping device configured to obtain shapes from a strip which correspond to said sheets still joined together, first advance means configured to make said strip advance along said feed path, a cutting device configured to cut said strip and make, by separating them, said sheets, and second advance means configured to make each of said sheets advance individually in a flat condition toward said forming unit.

7. Apparatus as in claim 1, wherein said work path of said forming unit is closed in a loop, preferably circular in shape or having at least one rectilinear segment.

8. Apparatus as in claim 1, further comprising an extraction member configured to extract one tubular element at a time from the respective forming device.

9. Apparatus as in claim 1, further comprising, along said work path, gluing means configured to apply an adhesive material on each of said sheets, if this is not already present on the sheets.

10. Apparatus as in claim 9, further comprising a drying station configured to dry the adhesive material after the tubular element has been formed.

11. Method for automatically producing tubular elements, to make smoking articles and/or products for food use, comprising in sequence a feed step in which sheets in a flat condition are fed, in sequence and one at a time, toward a forming unit configured to form said tubular elements starting from said sheets in a flat condition, a positioning step in which each of said sheets is positioned and temporarily held on an external surface of a forming pin of a forming device, said forming pin being rotatable around an axis of rotation thereof, and a movement step in which said forming device, together with the held sheet, is moved along a work path, and a forming step in which said forming device takes said sheet against contrast means which are disposed in a certain fixed position along said work path, while said forming pin, together with the held sheet, rotates around its axis of rotation so as to cause the folding of two flaps of said sheet in such a way that the latter is at least partly wound on the external surface of the forming pin.

12. Method as in claim 11, wherein in said forming step said forming pin, together with the held sheet, while it rotates around its axis of rotation along the work path, takes a first zone of a first flap of said two flaps to overlap with a second zone of a second flap of said two flaps, at least one of said first and second zones being provided with, or on which there is deposited, an adhesive material.

13. Method as in claim 12, wherein each of said sheets comprises an internal face configured to contact the external surface of said forming pin, a first lateral edge adjacent to which there is said first zone which has, or on which there is deposited, the adhesive material, and a second lateral edge adjacent to which there is, on an external face opposite said internal face, said second zone, configured to be contacted by said first zone through overlapping, the overlapping being created by the rotation of said forming pin around its own axis of rotation.

14. Method as in claim 11 wherein said forming step comprises a first folding step in which said forming device with said held sheet is made to advance along said work path in such a way that one of said two flaps is taken against a first contrast and guide member of said contrast means in order to fold it against said external surface of said forming pin, and a subsequent second folding step, in which said forming device is made to advance further along said work path in such a way that the other of said two flaps is taken against a second contrast and guide member of said contrast means in order to fold it against said external surface of said forming pin.

* * * * *